Dec. 15, 1925.
O. W. HEISE
RETARD GAUGE
Original Filed May 16, 1921
1,565,445
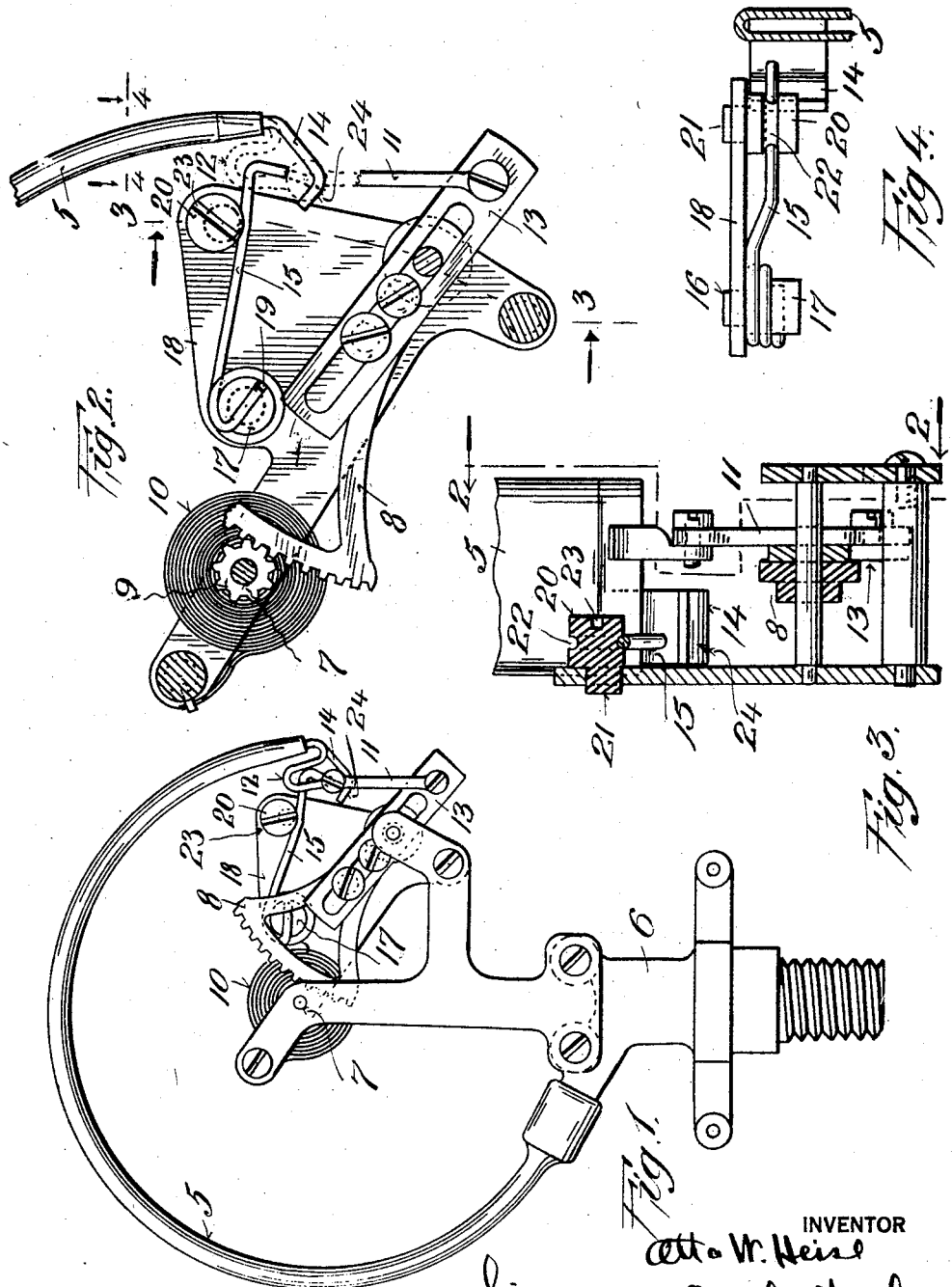
INVENTOR
Otto W. Heise
BY his ATTORNEYS Darby & Darby Patented Dec. 15, 1925.

1,565,445

UNITED STATES PATENT OFFICE.

OTTO W. HEISE, OF BRIDGEPORT, CONNECTICUT, ASSIGNOR TO MANNING, MAXWELL & MOORE, INC., OF NEW YORK, N. Y., A CORPORATION OF NEW JERSEY.

RETARD GAUGE.

Application filed May 16, 1921, Serial No. 470,076. Renewed May 12, 1925.

*To all whom it may concern:*

Be it known that I, OTTO W. HEISE, a citizen of the United States, residing at Bridgeport, in the county of Fairfield, State of Connecticut, have made a certain new and useful Invention in Retard Gauges, of which the following is a specification.

This invention relates to gauges, and, particularly to gauges of the retard spring type.

One object of the invention is to provide a retard gauge which is of simple structure, economical to manufacture, and efficient in use and wherein the parts may be quickly and easily assembled and desirable adjustments readily, quickly and easily attained.

A further object is to provide means whereby the tension of the retard spring employed in this type of gauges may be readily, easily and quickly varied or adjusted as occasion may require.

A further object is to provide means in a retard spring type of gauge whereby the point of application of the retard spring in attaining its retarding function may be quickly, easily, readily and effectively adjusted as occasion may require.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the accompanying drawings:—

Fig. 1 is a view in front elevation illustrating the application of a retard spring, and a mounting and adjustments therefor embodying the principles of my invention, to a Bourdon tube actuated gauge movement.

Fig. 2 is a broken detail view in section on the line 2—2 Fig. 3 looking in the direction of the arrows, and showing portions of the gauge movement, and the connections intermediate the same and the Bourdon tube, together with the retard spring and its tensioning and adjusting devices embodying my invention.

Fig. 3 is a similar view on the line 3—3, Fig. 2, looking in the direction of the arrows.

Fig. 4 is a similar view, inverted, on the line 4, 4, Fig. 2, looking in the direction of the arrows.

The same part is designated by the same reference numeral wherever it occurs throughout the several views.

In the use of pressure indicating gauges the demands of the modern art require a gauge structure wherein an auxiliary impedance or resistance is brought into play to oppose the movement of the pressure responsive element of the gauge in case the pressure to which such element is subjected exceeds a certain predetermined degree. Gauges in which this result is attained are now called in the art retard or retard spring gauges, and in their more essential features they have such arrangement as to impose on the pressure responsive element of the gauge an auxiliary spring resistance when the pressure exceeds a predetermined degree. In order to attain the widest range of utility and effectiveness of gauges of this type it is desirable to provide means to alter or adjustably vary the resiliency of the auxiliary or retard spring so that the same gauge may be employed under varying conditions and degrees of excess pressure. It is also desirable to provide means to adjustably control and regulate the point of application of the auxiliary tension which is to be imposed in the action of the pressure responsive element.

It is among the special purposes of my present invention to provide means which are exceedingly simple and efficient wherein these desirable adjustments are readily, easily and effectively accomplished.

In one illustrative application of my invention I have shown a gauge of the Bourdon tube type wherein the Bourdon tube 5 is connected at one end to a socket 6, designed, in the usual manner to be connected to the source of pressure to be indicated. It is to be understood, of course, that my invention is not to be restricted or limited in the application thereof to the Bourdon tube type of gauge, as it may be applicable to gauges wherein the pressure responsive element may be of other types.

The gauge movement, likewise, may be of any well known type or structure. An illustrative arrangement is shown wherein the spindle 7 which carries the dial hand or pointer is mounted in a suitable framework, and is rotatively actuated by means of a gear segment 8, engaging a pinion 9 on the dial hand spindle. A retracting or hair spring 10 resists the rotative displacement of the dial hand spindle from an initial or "zero" position of the dial hand. Any suitable connections may be employed intermediate the gear segment 8 and the pressure responsive element. In the illustrative arrangement shown a link 11 is pivotally connected at one end to a tip 12 carried by the pressure responsive element, in this instance the free end of the Bourdon tube, and at the other end to a slide member 13 of the gear segment.

The pressure responsive element is provided with a projection or member 14 with which is arranged to engage the free end of an auxiliary or retard spring 15 when the pressure to which said responsive element is subjected exceeds a predetermined degree. In order to adjustably regulate and control the tension of the retard spring 15, and hence the amount of auxiliary resistance said spring may impose upon the pressure responsive element, I propose, in accordance with my invention to provide the following arrangement. The shank 16 of a stud 17 is mounted in a hole formed in or through a suitable support, such, for example, as may be afforded by an extension 18 of the frame which supports the gauge movement. The fit of the shank 16 in the hole in its support 18 should be sufficiently tight to permit said shank to be rotatively moved and to hold the same in whatever position to which it may be rotatively moved. By providing the face of the stud 17 with a transverse slot 19, the desired rotative adjustment of the stud may be readily and easily accomplished by means of a screw driver. One end of the retard spring 15 is coiled about the stud 17, and is suitably anchored or secured thereto, as, for example, by disposing the same in the slot or kerf 19, as shown. By turning the stud 17 in one direction or the other the lever arm ore distance of the free end of the spring from the stud 20 is lengthened or shortened, thereby varying the resiliency of the spring and its effective resistance to movement by the Bourdon tube 5.

In order to adjustably control the point at which the auxiliary tension of the retard spring is brought into play, I provide a cam shaped stud 20, the shank 21 of which is fitted with a friction fit into a hole in or through the support 18, in like manner to the arrangement and fit of the shank 16 of stud 17 above described. The cam stud 20 forms an abutment against which the retard spring 15 bears. If desired, and in order to retain the spring 15 in bearing engagement with the cam stud 20, said stud is annularly grooved, as shown at 22, the spring resting in said groove. By rotatively adjusting the cam stud 20, the free end of the retard spring is brought closer to or is permitted to be held farther away from the engaging member 14 of the pressure responsive device, thereby adjusting the point of application of the retard spring. The desired rotative adjustments of the cam stud 20 may be readily, easily and effectively accomplished by means of a screw driver inserted in a slot or kerf 23 formed across the face of said stud.

It will be observed that it makes no difference in which direction the cam stud 20 is rotatively adjusted, the desired adjustment of the relation of the free end of the retard spring with reference to the member 14 of the pressure responsive element 5, is accomplished. The tight frictional fit of the shank 21 of the cam stud in the hole in support 18 retains said stud in its position of rotative adjustment.

In practice I have found it desirable to have the free end of the retard spring engage in the crotch of an angle shaped portion 24 of the member 14, see Fig. 2, and hence the extremity of said member is bent to provide a V-notch for this purpose.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having now set forth the objects and nature of my invention and a construction embodying the principles thereof, what I claim as new and useful, and of my own invention, and desire to secure by Letters Patent, is:—

1. The combination with a gauge movement, and a pressure responsive element, of a retard spring, means to support said spring at one end, the other or free end of said spring being arranged in the path of movement of the pressure responsive element, and a cam stud constituting an abutment engaging an intermediate portion of the spring, and means to adjust said cam stud to vary the point of application of said spring with respect to the pressure responsive element.

2. The combination with a gauge movement, of a pressure responsive element, said element having a contact member at its free end, a retard spring, a support for one end of said spring, the free extremity of said spring being arranged in the path of said contact member, and an adjustable cam stud forming an abutment engageable by an intermediate portion of said spring.

3. A gauge comprising a pressure responsive device, a rotatable normally fixed stud, an elongate retard spring coiled at one end about the stud and secured to the latter and having its free extremity disposed in the path of an element movable with the pressure responsive device, and an abutment engageable with an intermediate substantially straight portion of the spring.

4. A gauge comprising a pressure responsive element, a contact member movable with the latter, a support having an opening therein, a normally fixed rotatable stud having a friction fit in said opening, and elongate retard spring having one end secured to the stud and the other end disposed in the path of movement of the contact member, and a peripherally grooved cam stud engaging the spring at a point intermediate its ends.

5. A gauge comprising a pressure responsive device, a contact element arranged to partake of its movement, an elongate retard spring having a free end disposed in the path of movement of said contact element, adjustable means for supporting the spring at its opposite end whereby to permit the normal position of the free end of the spring to be varied, and means engageable with the spring at a point intermediate its ends for varying the resistance opposed by the spring to movement by the contact element may be varied.

In testimony whereof I have hereunto set my hand on this 5th day of May, A. D. 1921.

OTTO W. HEISE.